US005459219A

United States Patent [19]

Yamamoto

[11] Patent Number: 5,459,219

[45] Date of Patent: Oct. 17, 1995

[54] POLYMER MATERIAL IMPROVED IN ITS ELECTRIC INSULATION PROPERTIES

[76] Inventor: Shigeru Yamamoto, 3-21-3, Oomachi, Kamakura-shi, Kanagawa-Ken, Japan

[21] Appl. No.: 247,401

[22] Filed: May 23, 1994

Related U.S. Application Data

[63] Continuation of Ser. No. 657,821, Feb. 20, 1991, abandoned.

[30] Foreign Application Priority Data

Feb. 22, 1990 [JP] Japan .................................... 2-41974
Aug. 2, 1990 [JP] Japan .................................... 2-205621

[51] Int. Cl.[6] ............................................ C08F 110/02
[52] U.S. Cl. ............................................ 526/352; 528/488
[58] Field of Search ............................ 528/488; 526/352

[56] References Cited

U.S. PATENT DOCUMENTS

| | | | |
|---|---|---|---|
| 3,090,777 | 5/1963 | Antonsen et al. | 528/488 |
| 4,048,364 | 9/1977 | Harding et al. | 428/198 |
| 4,290,987 | 9/1981 | Soehngen et al. | 428/376 |
| 4,497,931 | 2/1985 | Hollis | 524/570 |
| 4,849,144 | 7/1989 | McLoughlin | 264/45.9 |

OTHER PUBLICATIONS

Raychem Ltd., Chemical Abstracts, vol. 107, No. 1 6 Jul. 1987 Abstract No. 10441M.
Bedrna et al., Chemical Abstracts, vol. 78, No. 28 21 May, 1973 Abstract No. 131162N.

*Primary Examiner*—Joseph L. Schofer
*Assistant Examiner*—Tom Weber
*Attorney, Agent, or Firm*—Wenderoth, Lind & Ponack

[57] ABSTRACT

The content of spherulites of polyethylene resins is reduced by contact of the polyethylene resin while it is molten with lithium carbonate which is in a subdivided form and is dispersed in the molten polyethylene resin or which is in a form of a block and is removed from the polyethylene resin after the contact. The dispersed lithium carbonate can be removed with the reduced spherulite content preserved.

9 Claims, 8 Drawing Sheets

POLYMER MATERIAL IMPROVED IN ITS ELECTRIC INSULATION PROPERTIES

This application is a continuation of now abandoned application Ser. No. 07/657,821, filed Feb. 20, 1991.

FIELD OF THE ART

The present invention relates to a polymer material preferably used for electric insulation and other applications.

RELATED ART

Electric devices and power cables have recently been miniaturized and thus electric field applied to their insulating materials has been increased, so that local discharge, that is partial discharge, is generated in contact with the interior or surface of the insulating materials. Particularly, the interior of the insulating materials has many small voids (air spaces), and partial discharge is generated at the voids. Part of the insulating materials is oxidized or burnt by the partial discharge, and the properties of the insulating materials are thereby lowered. If the partial discharge continues, it enlarges the voids and is transferred to tree-like discharge, which lowers the insulation life of the devices and the cables and eventually causes dielectric breakdown.

Particularly, in alternating current devices, partial discharge generates synchronously and stationarily corresponding to the cycles of alternating voltage and presents serious problem as compared with direct current devices.

As the mechanism for generating the partial discharge, the interior of the voids is filled with gas, of which capacitance is small, and the voltage applied to the gas is divided in inverse proportion to the large capacitance of the insulating materials around the voids. Thus, the electric field strength of the voids becomes extremely large and discharges easily.

Pulse-like or pulsating current is generated by the discharge of electric charge accumulated in the voids.

After the pulsating voids discharges have taken place, they are charged again upon the increase in the instantaneous value of the voltage applied. When the voltage applied is raised, second pulse discharge is caused. Thus, sequential pulse discharges are followed according to the increase of the electric voltage applied. When the instantaneous value of the electric voltage applied passes through the peak value, voltage applied to the voids turns and discharge pulse in the reverse direction is generated. The discharge pulse is generated in the range wherein applied voltages to time vary largely, and it forms pulses in the opposite direction every half cycle. Insulating materials have a large number of voids, and thus electric current passing through the insulating materials is an alternating current containing a number of pulses (as shown in FIG. 9(*a*) which will hereinbelow be described in more detail).

As the method for controlling partial discharge from insulating materials of devices, there are mentioned methods of filling up voids by impregnation of the voids with an oil having low viscosity, a voltage stabilizer or the like or by addition of a variety of inorganic materials. The addition of inorganic materials has been conventionally conducted and is to control discharge thanks to the semiconductive inorganic materials deposited on the surface of the voids whereby the surface resistance of the voids are lowered (see, Japanese Patent Laid-Open Publication No. 253711/1986).

However, the aforementioned methods of filling up voids by impregnation thereof with an oil having low viscosity, a voltage stabilizer or the like or by addition of semiconductive inorganic materials may not always give satisfactory results, since these methods do not work for removing voids themselves.

The present invention has been accomplished on the basis of these backgrounds, and the object of the present invention is to provide a polymer material which works for removing the generation of voids affecting on insulating materials by the selection of inorganic materials to be added and is suited preferably for electric insulation or the like.

SUMMARY OF THE INVENTION

The present invention accomplished for solving the aforementioned problem has a feature which comprises addition of, e.g., 0.1–3%, preferably 0.5–2.5%, more preferably about 1% of lithium carbonate in a subdivided form, equivalent to, for example, 300 mesh or lower, to a molten polyethylene resin, percentage being by weight of lithium carbonate+polyethylene resin, and cooling the admixture, or contact of a mass of lithium carbonate with a molten polyethylene resin and cooling the admixture.

That is, the present inventor has found during a series of investigations for preventing the aforementioned generation of the voids that the growth of spherulites causing the generation of voids is inhibited by the addition of lithium carbonate, reached the present invention. The inhibition of the growth of the spherulites with lithium carbonate in the polyethylene resin containing lithium carbonate is also recognized even when the lithium carbonate added is removed therefrom.

DETAILED DESCRIPTION OF THE PREFERRED EMBODIMENTS

The present invention is characterized by, inter alia, polyethylene resins having no or reduced content of spherulites by the contact of the resin with lithium carbonate.

Polyethylene Resins to be Treated

Polyethylene resins which produce the polyethylene resins having no or reduced quantity of spherulites in accordance with the present invention can be any of such resins solely or predominantly comprising ethylene, non-crosslinked or crosslinked, produced by any suitable process which may be polymerization of ethylene.

Polyethylene resins (e.g. a low density polyethylene resin having a density of 0.91–0.93 g/$cm^3$ and medium and high density polyethylene resins having a density of 0.94–0.97 g/$cm^3$ such as ASAHI DOW 6545 polyethylene resin pellets) is a mass of many linear polymer chains

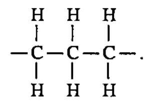

Polyethylenes having many side chains such as $CH_3$, $C_2H_5$ or $C_4H_9$ on the linear polymer chain is referred to as low density polyethylene resins, and the ones having few such side chains are referred to as medium or high density polyethylene resins.

Figures 1A, 1B, 1C:
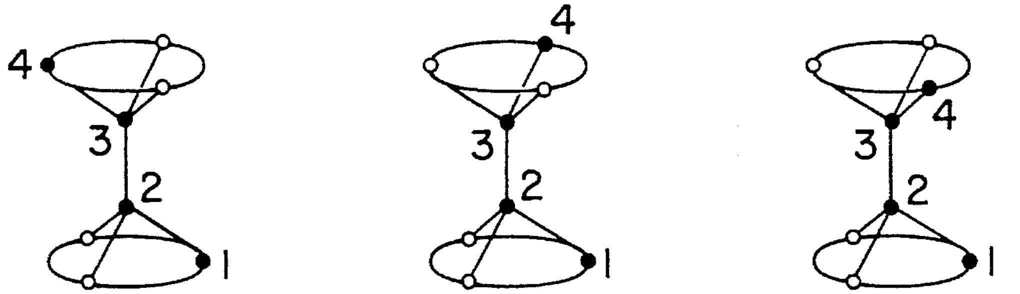
FIGS. 1*a*, 1*b* and 1*c* show spatial configurations that the polymer chain of a polyethylene resin can take.

The polymer chains of a polyethylene resin can take the spatial configurations represented in FIGS. 1*a*, 1*b* and 1*c*. In the figures, solid dots represent carbon atoms, and FIG. 1 shows the most stable configuration wherein the carbon atoms 1 and 4 are arranged in the opposite directions to each other with reference to the chain of the bond between carbon atoms 2 and 3. Such a configuration is called a trans bond, and all of polyethylene resins at ordinary temperature take this bond. However, when the polyethylene resin is heated to an elevated temperature, part of the resin takes a metastable configuration which is called a gauche bond as shown in FIGS. 1*b* and 1*c*. Such a bond indicates a state that carbon atoms 1 and 4 are twisted at ±120° with reference to the chain of the bond between carbon atoms 2 and 3. In FIGS. 1*a*, 1*b* and 1*c*, vacant dots represent the other configurations that the carbon atoms of solid dots can take.

The polymer chain which takes the gauche bond, viz. gauche chain, can be easily identified from the absorbance of infrared absorption at 1078 $cm^{-1}$ and 1352 $cm^{-1}$. The present inventor has found that when lithium carbonate is added to a polyethylene resin, strong absorptions attributed to the gauche bond appears and indicates the twisting of a part of the main chain of the polyethylene, which inhibits the growth of spherulites described below.

Figures 2A, 2B:
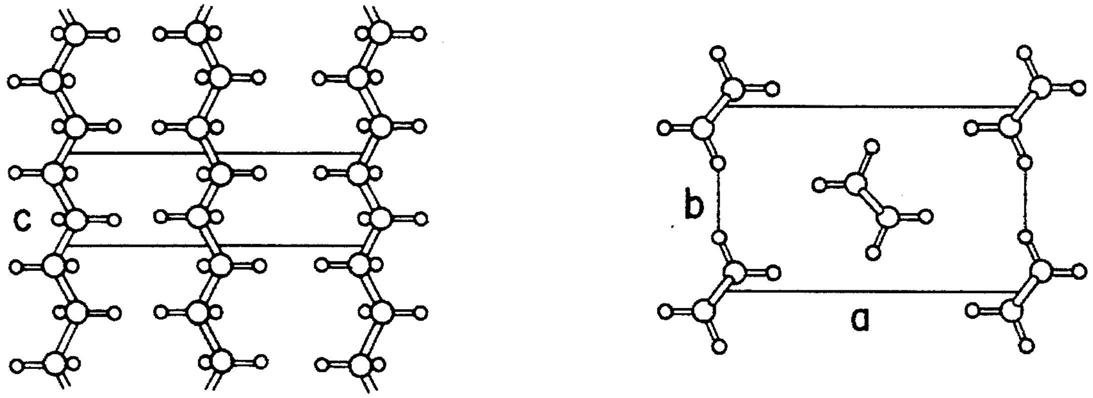
FIGS. 2*a* and 2*b* show crystal structures of a polyethylene resin.

Polyethylene resins have a zigzag plain structure wherein the main chain has a trans bond without twisting, and the polymer chain is regularly arranged to form crystal structures shown in FIGS. 2*a* and 2*b*, wherein a large circle represents a carbon atom and a small circle represents a hydrogen atom.

In this connection, a, b and c are lattice constants which represent the three axes of a unit lattice, and a=7.40 Å, b=4.93 Å and c=2.53 Å in the case of a polyethylene resin.

Figure 3:
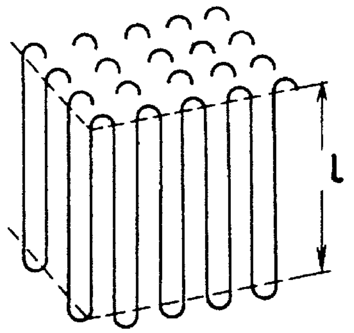
FIG. 3 is a perspective view showing how a polymer chain of polyethylene is folded.
Figure 4:
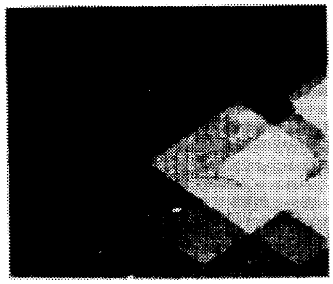
FIG. 4 is a photomicrograph showing a crystal structure of lamella microcrystals.
Figure 5:
FIG. 5 is a polarization photomicrograph showing a crystal structure of spherulites of a polyethylene resin.

The parallel main chain is folded at a length of l= 100–150 Å as shown in FIG. 3 and takes a lamella microcrystal as shown in FIG. 4. The crystals are those deposited from a dilute xylene solution of the polyethylene which contain the polyethylene resin in a proportion of about 0.1% by weight to xylene. On the other hand, in a solid prepared from a molten state at an elevated temperature of at least a melting point 105° C. of a low density polyethylene resin or of at least a melting point 125° C. of a medium or high density polyethylene resin or from a concentrated solution of a polyethylene resin dissolved in a small amount of a solvent at the elevated temperature, the lamella microcrystals comprise microcrystals piled up around a given nucleus in the radial direction, and thus result in forming spherulites which is produced with spherical symmetry as shown in FIG. 5. The spherulites are produced instantaneously.

In general, a polyethylene resin prepared from the molten state is such that ca. 80% by weight of it is crystallized in a state of spherulites. Such resins are called a crystalline polymer. The low density polyethylene resin used in the present invention has a crystallinity of 86.6%, provided that the crystals in the state of spherulites are limited to the case that the main chain of the polymer has a trans bond.

Chemistry of Polyethylene Resins Contacted with $Li_2CO_3$

When lithium carbonate ($Li_2CO_3$) is added to a molten polyethylene resin, about 3–4% by weight of the main polymer chain may be transformed into one comprising non-crystalline gauche bonds as judged from the gel fraction of the resin described later, whereby the production of spherulites is suppressed due to formation of the gauche bonds. As a result, sharp infrared absorptions attributed to the gauche bond are observed in the samples having lithium carbonate added.

Figure 6A:
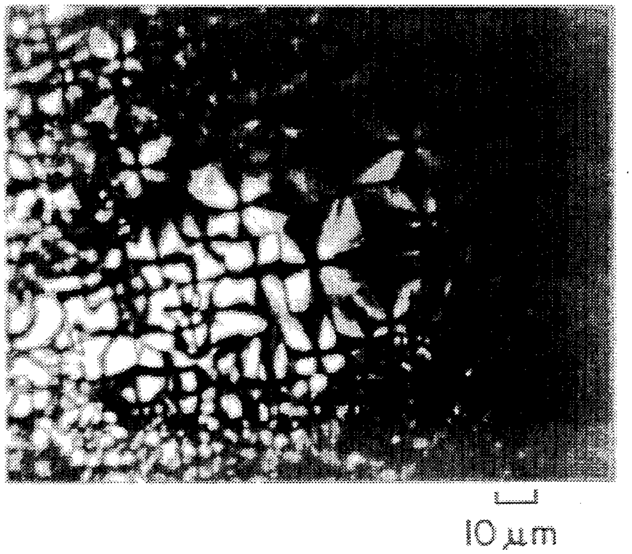
FIGS. 6*a* to 6*g* are polarization photomicrographs showing crystal structures of spherulites of polyethylene having no or various powder materials added.
Figure 6B:
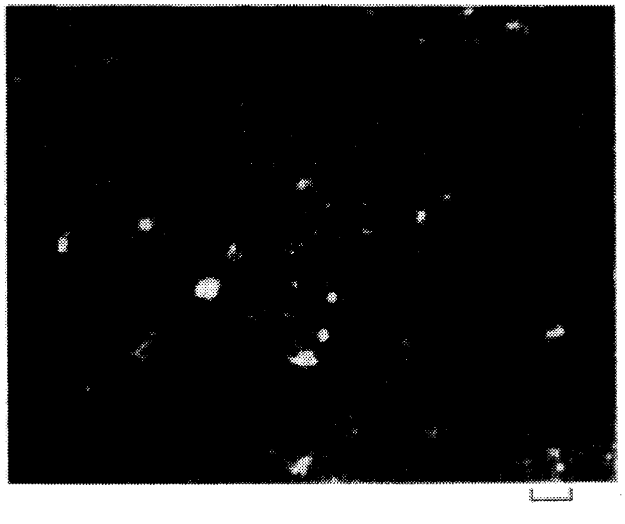
Figure 6C:
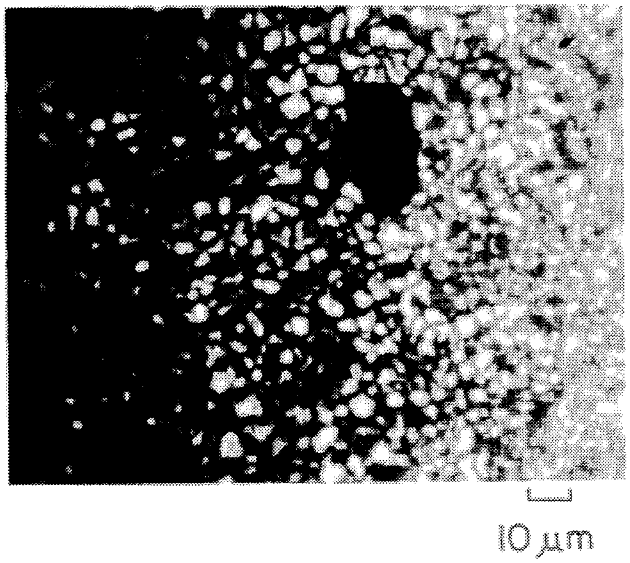
Figure 6D:
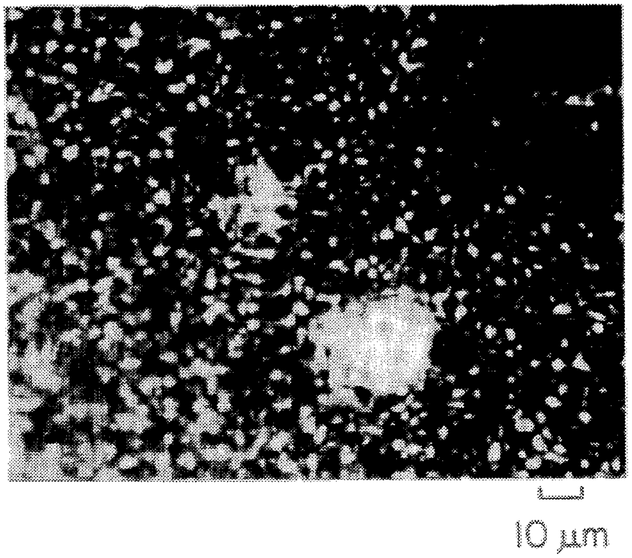
Figure 6E:
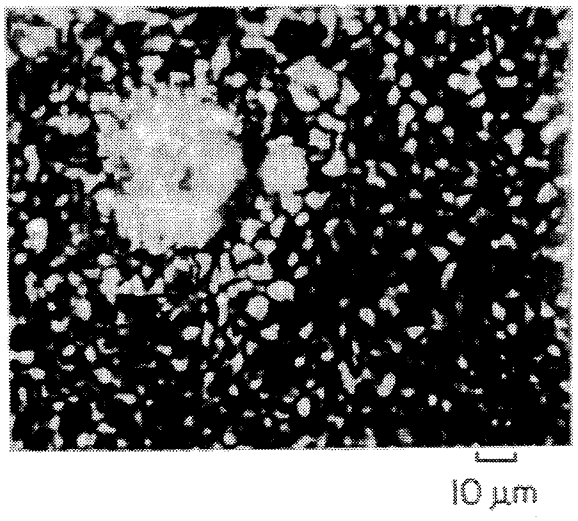
Figure 6F:
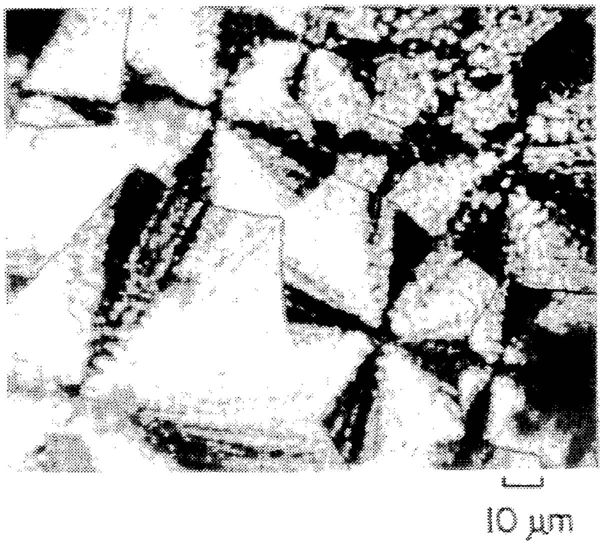
Figure 6G:
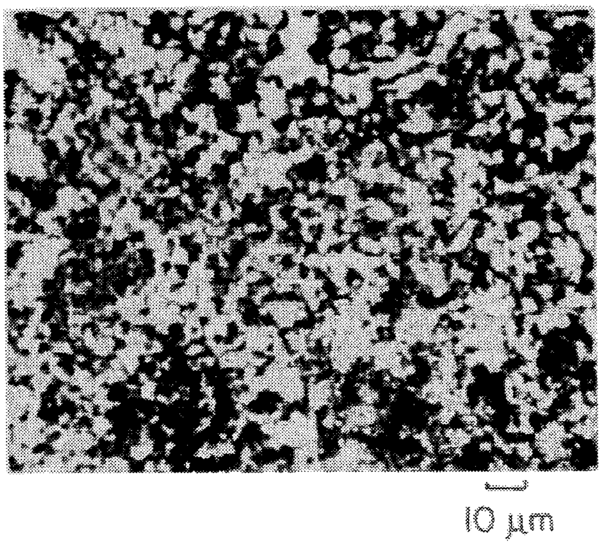
Figure 7:
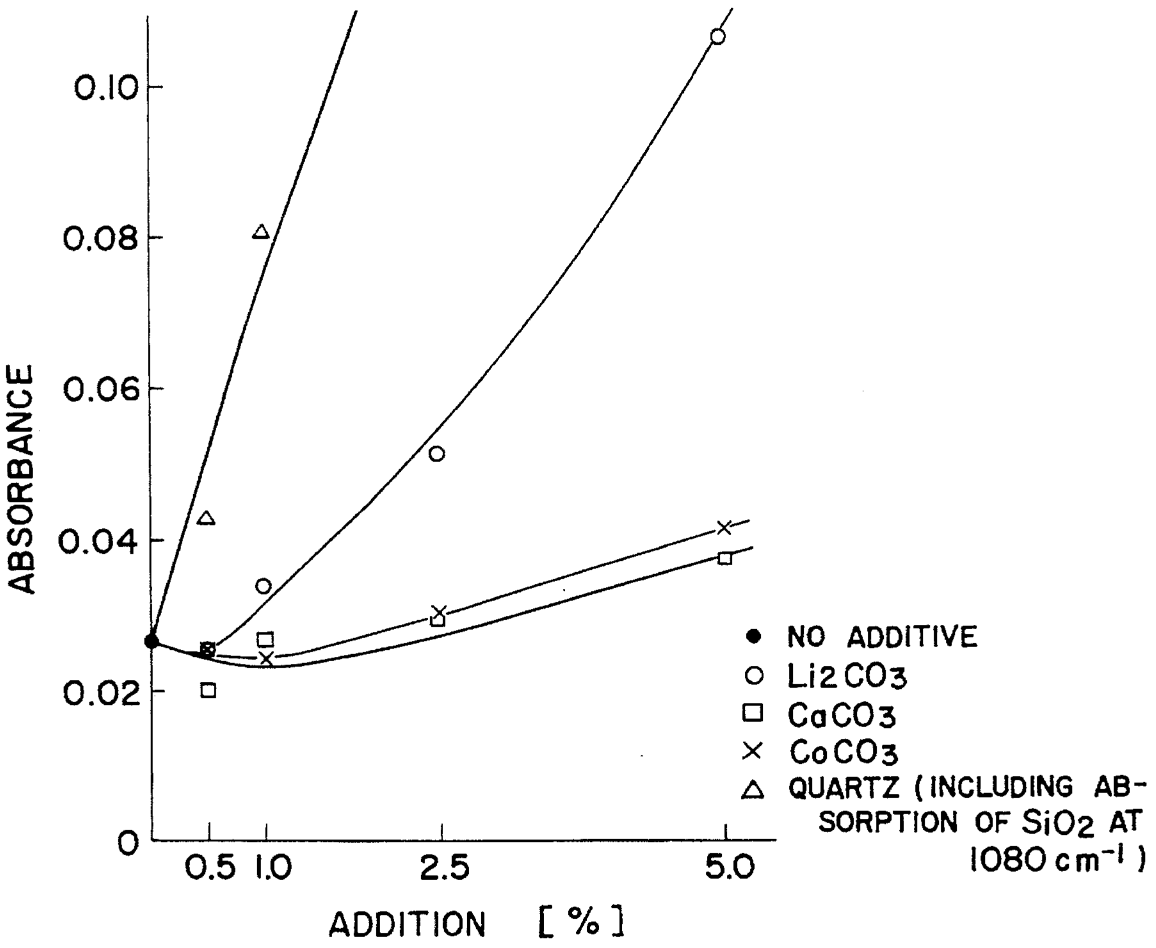
FIG. 7 shows absorbance characteristics of the gauche chains of polyethylenes having no or various powder materials added.
Figure 8:
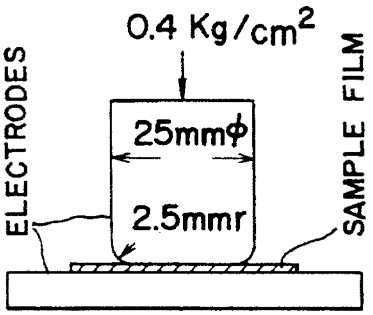
FIG. 8 shows a side view of an electrode designed for partial discharge determination.
Figure 9:
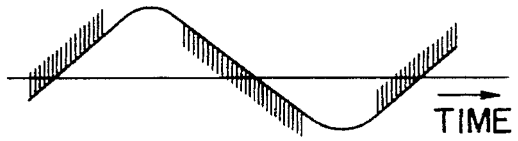
FIGS. 9*a* and 9*b* are time charts showing wave forms of discharge currents.
Figure 9:
Figure 10:
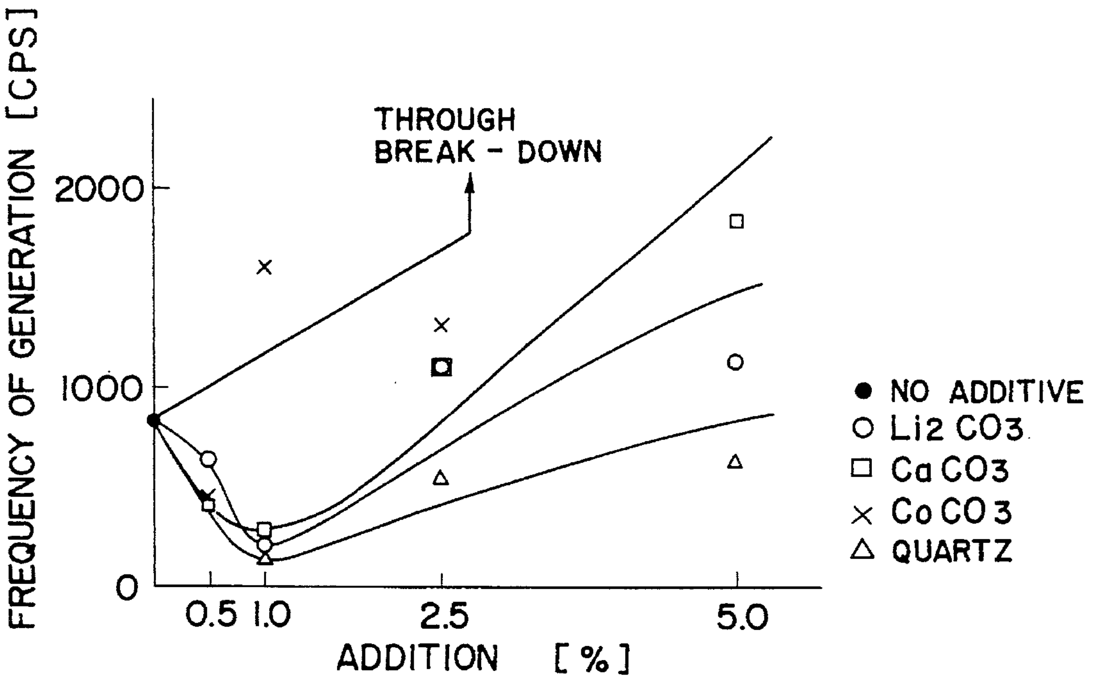
FIG. 10 is a chart showing frequency of generation of discharge pulses on polyethylenes having no or various powder materials added.
Figure 11:
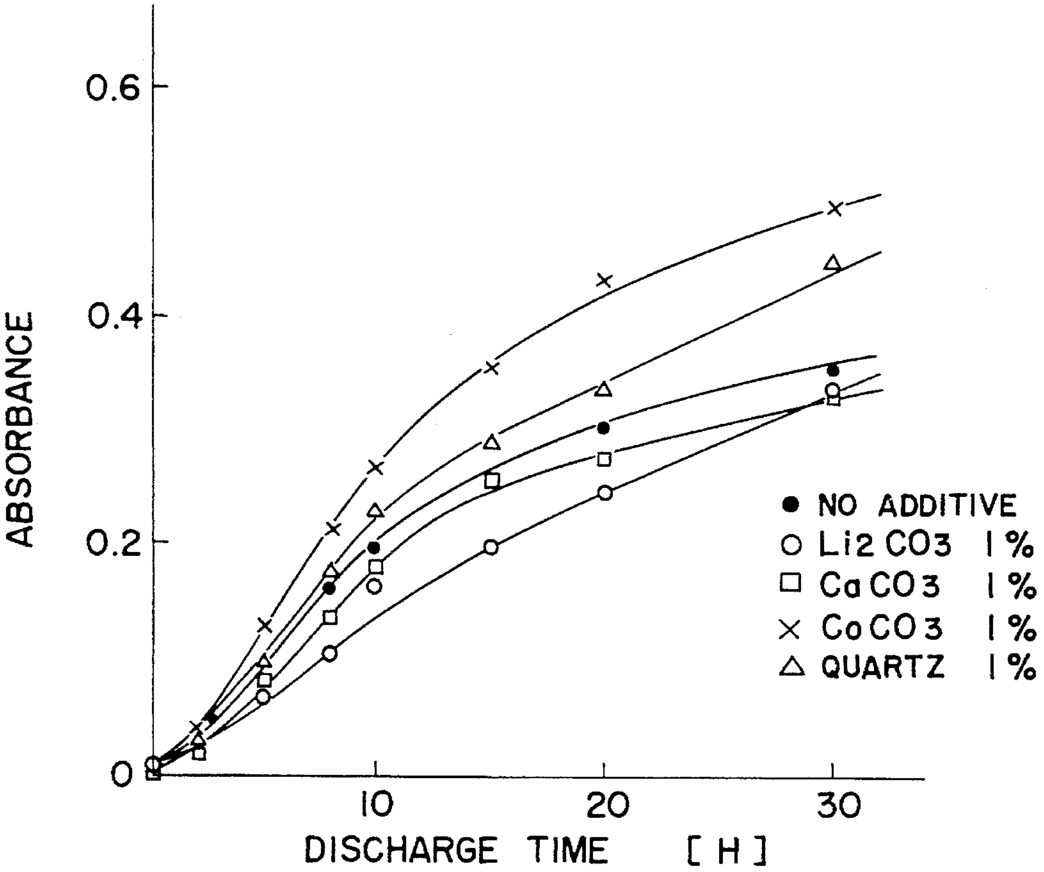
FIG. 11 is a chart showing absorbance characteristics of ketonic organics generated upon partial discharge of polyethylenes having no or various powder materials added.
Figure 12A:
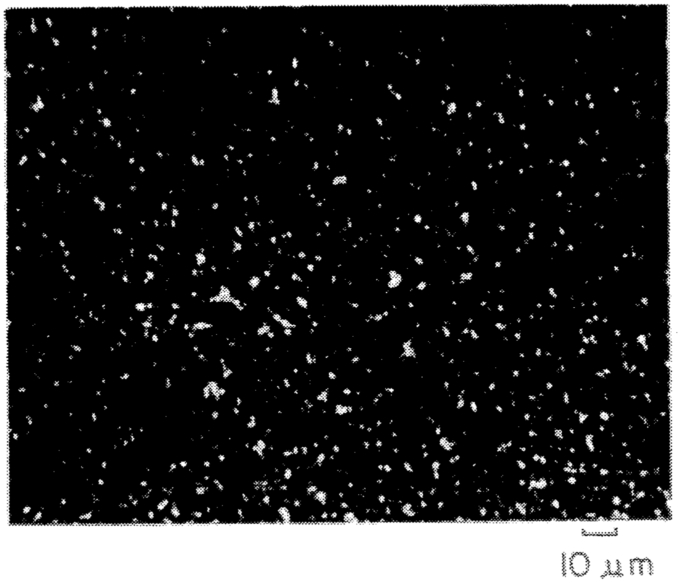
FIGS. 12*a* to 12*c* are polarization photomicrographs of crystal structures of spherulites of polyethylene resins.
Figure 12B:
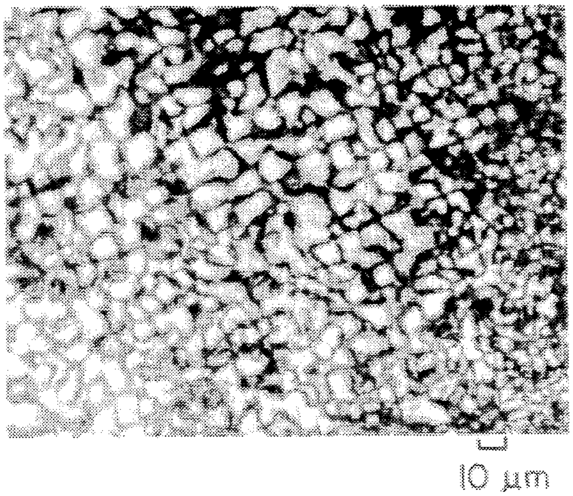
Figure 12C:
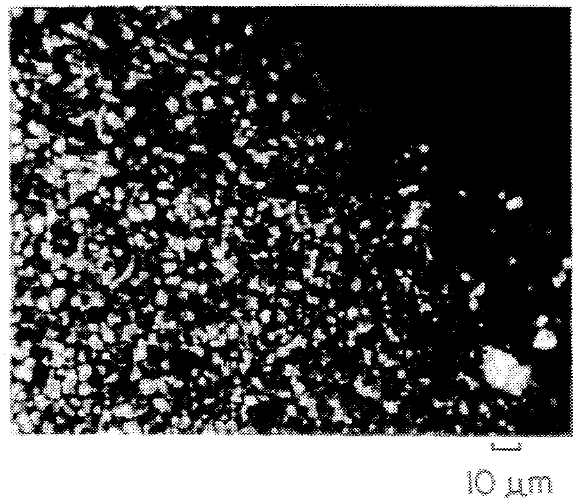
Figure 13A:
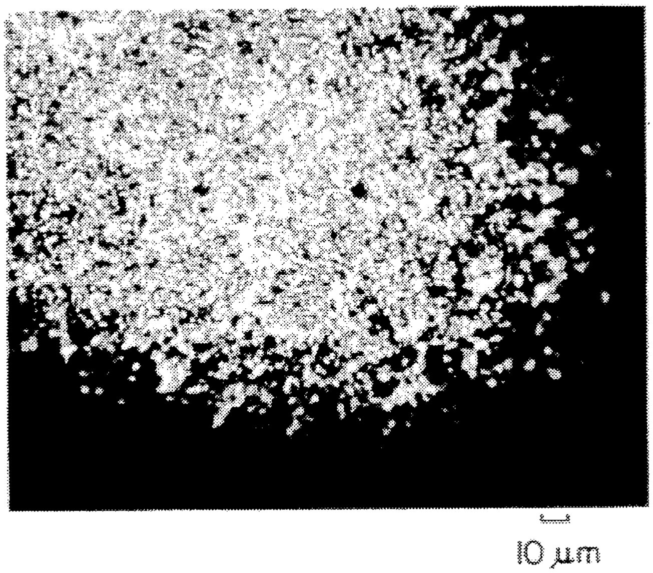
FIGS. 13*a* to 13*c* are polarization photomicrographs showing crystal structures of spherulites of various polyethylene resins after the treatment with xylene under heating into solution.
Figure 13B:
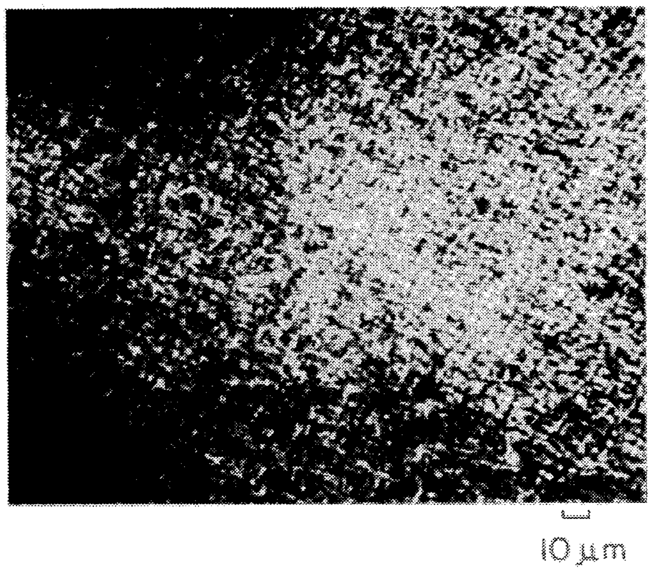
Figure 13C:
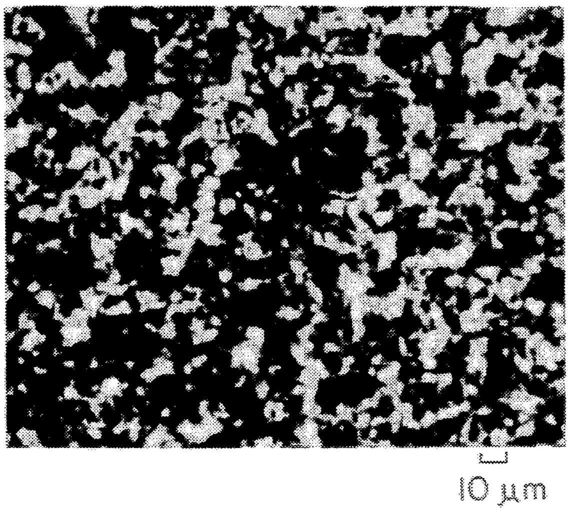

The present invention is now explained with reference to FIGS. 6–12. Some detailed explanation of each figure is as follows:

Among FIGS. 6*a*, 6*b*, 6*c*, 6*d*, 6*e*, 6*f* and 6*g*, FIGS. 6*a* to 6*e* are polarization photomicrographs showing crystal structures of spherulites of low density polyethylene resins having no or various additives added, wherein FIG. 6*a* shows the case of the resin having no additive, FIG. 6*b* shows the case of the resin having 1% by weight of lithium carbonate added, FIG. 6*c* shows the case of the resin having 1% by weight of cobalt carbonate added, FIG. 6*d* shows the case of the resin having 1% by weight of quartz added and FIG. 6*e* shows the case of the resin having 1% by weight of calcium carbonate added; FIGS. 6*f* and 6*g* are polarization photomicrographs showing crystal structures of spherulites of high density polyethylene resins having no additive and lithium carbonate added, respectively, wherein FIG. 6*f* shows the case of the resin having no additive and FIG. 6*g* shows the case of the resin having 1% by weight of lithium carbonate added;

FIG. 7 shows absorbance characteristics of the gauche chains of polyethylenes having no additive or lithium carbonate, calcium carbonate, cobalt carbonate or quartz added;

FIG. 8 shows a side view of an electrode designed for partial discharge determination;

FIGS. 9*a* and 9*b* are time charts showing waveforms of discharge currents, wherein FIG. 9*a* is a waveform chart of alternating current and FIG. 9*b* is a pulse waveform chart after filtration treatment;

FIG. 10 is a chart showing frequency of generation of discharge pulses on polyethylenes having no additive or lithium carbonate, calcium carbonate, cobalt carbonate or quartz added;

FIG. 11 is a chart showing absorbance characteristics of ketonic organics generated upon partial discharge on partial discharge of polyethylenes having no additive or lithium carbonate, calcium carbonate, cobalt carbonate or quartz added;

FIGS. 12*a*, 12*b* and 12*c* are polarization photomicrographs of crystal structures of spherulites of polyethylene resins, wherein FIG. 12*a* pertains the case where the polyethylene resin having lithium carbonate and paraffin for lowering the viscosity added both in 10% by weight, respectively, was heated and the lithium carbonate added was removed by filtration, FIG. 12*b* pertains to the case where the polyethylene resin in which one lithium carbonate particle of diameter of 100 μm had been added was heated to be molten, the lithium carbonate added was then removed and the resin was melted again by heating, and FIG. 12*c* pertains to the same case as shown in FIG. 12*b* except for the fact that the left part adjacent to the part shown in FIG. 12*b* is shown; and FIGS. 13*a*, 13*b* and 13*c* are polarization photomicrographs showing crystal structures of spherulites of various polyethylene resins after the treatment with xylene under heating into solution, wherein FIG. 13*a* pertains to the case where the crystal structure of the spherulite that the sample of the polyethylene resin which had undergone the treatment with xylene at 100° C. under heating into solution for 10 minutes was dried and then melted by heating, FIG. 13*b* pertains to the case where the sample of the polyethylene resin having 1% by weight of lithium carbonate added and treated was subjected to the treatment such that the resin was heated at 100° C. for 10 min. in the presence of xylene and products insoluble in xylene including lithium carbonate was removed by a filter paper and the sample after being dried was heated; and FIG. 13*c* pertains to the case where the sample treated according to the method described in FIG. 13*b* was crosslinked chemically with a crosslinking agent of dicumyl peroxide.

1, 2, 3, 4 . . . carbon atoms, l . . . length of the folded parallel main polymer chain of the polyethylene resin in Angstrom: Å, a, b, c . . . lattice constants showing the lengths of the three axes constituting the unit lattice.

The spherulites are observed in a polarization photomicroscope as a substance having black cross dark lines, and the micrographs of the spherulites of the low density polyethylene resins having a density of 0.91 g/cm$^3$ are shown in FIGS. 6*a*, 6*b*, 6*c*, 6*d* and 6*e*. FIG. 6*a* shows the spherulites of the polyethylene resin having a diameter in the range of about 20–30 μm. FIG. 6*b* shows the sample of the polyethylene resin having 1% by weight of lithium carbonate added, in which white parts is lithium carbonate and large spherulites have disappeared while spherulites having a diameter of about 5 μm are dimly seen.

FIGS. 6*c*, 6*d* and 6*e* are the photomicrographs of the samples for comparison having 1% of cobalt carbonate (black part), quartz or calcium carbonate, respectively, added, in which a number of spherulites having got out of shape are present. Furthermore, it has been confirmed that the spherulites are observed also in the cases of the polyethylene resins having a lithium salt compound such as lithium oxalate or lithium fluoride added.

Moreover, FIGS. 6*f* and 6*g* are photomicrographs of a low-pressure, high density polyethylene resin having a density of 0.955 g/cm$^3$. FIG. 6*f* shows the spherulites, which have a diameter of 90 μm and are large and clear. FIG. 6*g* shows the sample which underwent the addition of lithium carbonate and heating, in which the spherulites have disappeared.

As is apparent from the above description, lithium carbonate is most effective for the inhibition of the growth of the spherulites.

FIG. 7 shows absorbance characteristics at 1078 cm$^{-1}$ in the infrared absorption of the gauche bonds of low density polyethylenes having 0.5–5% of various inorganic materials added and indicates that the larger the absorbance, the more the gauche chain. The polyethylene resin having quartz added has the largest absorbance, which is due to the wide strong absorption at 1080 cm$^{-1}$ including also 1078 cm$^{-1}$ which is not attributed to the gauche bonds, and no particular inhibition of the growth of the spherulites are thus observed.

Particularly, when lithium carbonate is added, a larger absorption appears as compared with the addition of calcium carbonate or cobalt carbonate. In this connection, it is only lithium carbonate that shows an infrared absorption at 1078 cm$^{-1}$ corresponding to the infrared absorption of the gauche bond in these inorganic materials, and lithium carbonate exhibits an absorbance of about 0.05 when it is compacted into a tablet. It is the inventor's assumption that the molecular vibration of lithium carbonate as an inorganic material added in a small amount into a polyethylene resin induces the molecular vibration of the gauche bond of the polyethylene resin as an organic material, the trans chain of the polyethylene main polymer chain is transformed into the gauche chain, the adjacent main polymer chain due to the folding is then transformed into the gauche chain by the induction effect, and the sequential propagation of the induction effect produces a number of molecular chain of the gauche bond.

In the case of the polyethylene resin in which the gauche chain is formed by the addition of lithium carbonate, part of the non-crystallized portion is transformed into the gauche chain, and the production of large spherulites is thereby suppressed.

Electrical Aspect of Polyethylene Resins Contacted with $Li_2CO_3$

The measurement of the anti-partial discharge characteristics of samples having various inorganic materials added are explained below.

A molten material having an inorganic material added is formed into a film sample having a thickness of 0.1 mm by a heating roll stretcher at 190° C., arranged between electrodes shown in FIG. 8 and dipped into an oil such as silicon oil in order to prevent discharge from the ends of the electrodes. An electric field having an electric field strength of 50 KV/mm is applied, and the frequency of the generation of pulses at an electric charge of 10 pc (pc: $10^{-12}$ coulomb) or more in proportion to the amount of the inorganic material added is measured by a corona measuring apparatus. The "frequency of the generation of pulses" indicates, as shown in, for example FIG. 9*b*, the frequency of the generation of only a pulse component obtained by the filtration treatment of an alternating current containing a number of pulses, having a unit of counts per second referred to as cps. The results are shown in FIG. 10.

As FIG. 10 shows, when each of the inorganic materials except cobalt carbonate is added in an amount of 1%, the frequency of generation exhibits the minimum and decreases to one fourth of the case of the polyethylene resin having no additive, which indicates the improvement of the anti-partial discharge characteristics.

While the sample having quartz added has a minimal frequency of the generation of discharge pulse, such a minimal frequency is due to the lowering of the void surface resistance. The sample having quartz added has a very distinguished defect of the oxidative deterioration due to the partial discharge described below.

The electrodes for homogeneously denaturating and oxidatively deteriorating the film sample by partial discharge are desirably those comprising a pair of parallel plates having a gap therebetween of a 1 mm. When a sample is arranged within the gap and an alternating voltage of 50 Hz and 6 KVrms is applied, a large amount of ozone is generated within the gap by the strong partial discharge, and the sample generates a large amount of organic acids, particularly ketonic acids, by ozone oxidation. Thus, the sample is deteriorated due to the lowering of the insulating properties.

It is possible to observe the extent of the deterioration due to the partial discharge by the infrared absorbance of the ketone at 1715 $cm^{-1}$.

FIG. 11 thus shows the absorbance characteristics of ketonic organic acids generated from samples having various inorganic materials added in an amount of 1%, respectively, plotted against the discharge time. As the figure shows, the samples having cobalt carbonate or quartz added are deteriorated more seriously than the sample having no additive. The least deterioration is observed in the sample having lithium carbonate added, which has a deterioration resistant properties against partial discharge.

As described above, it has been found to be optimal to add about 0.8–1.4% by weight, particularly about 1% by weight, of fine powder of lithium carbonate of, for example, 300 mesh or 46 μm in average diameter or smaller improve polyethylene resins by reducing the generation of the partial discharge of the polyethylene resin and minimizing the oxidation or deterioration due to the partial discharge thereby improve anti-partial discharge properties of the polyethylene resins. Thus, the production of the spherulites of polyethylene can be inhibited and the generation of the partial discharge can be suppressed by the disappearance of voids between one spherulites and the other. Moreover, the possibility of the polyethylene main polymer chain to take the configuration of the gauche bond indicates the "filling" effect of voids produced during the molding of the resin, and thus the voids will disappear.

$Li_2CO_3$-Free Compositions

Lithium carbonate which has, as shown above, an effect to diminish the voids between one spherulite and the other in the mass of polyethylene resins and voids produced during the molding scarcely affect the electric insulating property of the polyethylene resin even when it remains in the resin if its content is about 1%. It is, however, desirable to remove the added lithium carbonate after the transformation of the polyethylene main polymer chains into the gauche chain has taken place in consideration that the mechanical strength or the like of the polyethylene resin be maintained at the highest level possible. When experiments were conducted on the basis of the viewpoint, it has been found that the gauche chain of the polyethylene resin which has been once transformed by the addition thereto of lithium carbonate may not revert to the original trans chain even after the removal of the lithium carbonate added and thus a new polyethylene resin containing the gauche chain and having functions excellent in thermal, electric or chemical properties is thereby formed. In this case, the lithium carbonate added can be considered to act as a catalyst on the polyethylene resin.

FIG. 12*a* shows the polarization photomicrograph of the sample that to a molten polyethylene resin was added 10% by weight of lithium carbonate having a particle size of 65 mesh (210 μm) or more, a part of the polyethylene main polymer chain was thereby transformed into the gauche chain, 10% of paraffin (melting point: 60°–62° C.) was then added for lowering the viscosity to convert it into a fluid, and lithium carbonate was removed from the fluid composition by a filter having 300 mesh. No spherulites are observed in this microphotograph, and lithium carbonate is not contained in the sample and has thus acted only as a catalyst on the polyethylene resin.

FIG. 12*b* shows the polarization microphotograph of the sample of a polyethylene resin that one particle of lithium carbonate having a particle diameter of 100 μm is placed in a polyethylene resin and the polyethylene resin undergoes the heat treatment at 190° C., the lithium carbonate added is removed, and another heat treatment is again conducted to the polyethylene resin. The dark area at the right hand side of the figure shows the trace that the lithium carbonate has been removed.

In this case, it is observed that within 200 μm in the radial direction from the lithium carbonate placed the spherulites are inhibited from growth and will not be reproduced easily even by the further heat treatment after the removal of the lithium carbonate added. The spherulites in the center and the left hand side of FIG. 12*c* which shows the portion adjacent to the left side of the microphotograph shown in FIG. 12*b* are found in the region which is too remote from the lithium carbonate placed to produce the gauche chain and to which the influence of placement of the lithium carbonate has not reached.

It has thus been confirmed from the above description that the gauche chain once produced by the addition of lithium carbonate is thermally stable even if the lithium carbonate has been removed and is not dissolved easily by heating whereby the effect of the lithium carbonate on inhibiting the growth of the spherulites is maintained.

It is believed in the art that the gauche chain of a polymer has a higher energy by about 500–600 Cal/mole as compared with the trans chain and thus is stable thermally (see Physical Property and Molecular Structure of Polymers, in Japanese: KAGAKU DOJIN; page 64; published on May, 1973). As a test method of the resistance to thermal decomposition of high molecular resins, there is a way in which the half-life temperature determined by the reduction in the weight by the thermal decomposition of a sample is used as a thermal decomposition temperature (Durability of Plastics, in Japanese: KOGYO CHOSAKAI; page 65; published on May, 1975).

For example, this method comprises heating about 10 mg of a sample isothermally for 5 minutes for each of the temperatures of room temperature and the temperatures of 100° C., 200° C., 300° C. and so on so that the temperature is raised by 100° C. until the reduction of the weight by the pyrolysis of the sample reaches 0 mg, obtaining the reduction characteristics of the sample weight at the respective temperatures and thus determining the temperature corresponding to the level at which the weight reduction rate is 50% to be the half-life temperature which is finally used as a thermal decomposition temperature.

The thermal decomposition temperature obtained by this method is 357° C. for the low density polyethylene resin; 430° C. for the sample of the low density polyethylene resin which has undergone the heat treatment in the presence of 0.5% by weight of lithium carbonate of 300 mesh added; 460° C. for the sample of the low density polyethylene which has undergone the heat treatment in the presence of 1.0%, 10% and 20% by weight of lithium carbonate added; and 430° C. for the sample of the low density polyethylene which has undergone the heat treatment in the presence of lithium carbonate and of 10% by weight of paraffin shown in FIG. 12a followed by removal of the lithium carbonate by filtration. It has thus been found that the thermal decomposition temperatures are raised by 73 to 103° C. by the heat treatment in the presence of lithium carbonate whereby the heat resistance is extensively improved.

It is also known in the art that polymer resins are crosslinked by crosslinking agents or due to hydrogen bonding to form a gel which is insoluble in a solvent. The extent of the cross-linking or gelling can be represented by a gel fraction determined on, for example, a low density polyethylene resin by dissolving the polyethylene with xylene in 10 times by weight of the sample at 100° C. for 10 minutes, separating the insoluble resin component by a filter, weighing it, and indicating the weight in % by weight.

While the gel fraction of the low density polyethylene resin after the aforementioned xylene treatment is 0%, it is 3.5% in the sample which has undergone the heat treatment in the presence of 1% by weight of lithium carbonate. In this case, it is believed that the gauche chains produced by lithium carbonate added produces the gel.

FIG. 13a shows the polarization photomicrograph of the sample that the xylene solution having 0% of the aforementioned gel fraction was dried and then heated to be molten. The spherulites have a diameter as small as about 10 μm and is out of shape. In this case, the molecular chains of the polyethylene resin are swollen by the xylene, and small spherulites are produced.

FIG. 13b shows the polarization photomicrograph of the sample produced by dissolving by xylene the aforementioned polyethylene resin having lithium carbonate added and having 3.5% of the gel fraction, filtering the solution, drying the solution and then heating to be molten, wherein no spherulites are observed contrary to the case shown in FIG. 13a.

Thus, it has thus been found that even if the lithium carbonate once added to a polyethylene resin is removed by filtration from the solution of the polyethylene resin in xylene, the gauche chain produced is not decomposed by the solvent and retaining its function to inhibit the production of spherulites.

FIG. 13c shows the polarization photomicrograph of the sample shown in FIG. 13b having been chemically cross-linked with a cross-linking agent which is dicumyl peroxide. No production of the spherulites are observed also in this case.

When a high electrical insulating property is expected of polyethylene resins, the resins should desirably be of a single species and pure, and thus lithium carbonate used for the production of the gauche chain is desirably removed. Even when lithium carbonate once added to polyethylene resins is removed therefrom when the resins are "fluid" upon dissolution or melting by filtration or centrifugation, gauche chain once produced will not be transformed into the trans chain and a homogeneous polyethylene resin free of a compounding additive can be obtained with maintenance of a pulse discharge suppressing effect due to the disappearance of voids between one spherulite from the other. For making the polyethylene resin "fluid", use can be made, at 60° C. or higher, of 5% by weight or less of a solvent such as a paraffinic hydrocarbon, an aromatic hydrocarbon or a chlorinated hydrocarbon, for example paraffin, tetralin, xylene, carbon tetrachloride or perchloroethylene. Therefore, a resin having electric and mechanical properties superior to those of the polyethylene resin having lithium carbonate added in an amount, for example, of about 1% by weight (when the lithium carbonate is in the powder of around 300 mesh) can be prepared.

Moreover, instead of transforming a part of the polyethylene main polymer chain into the gauche chain by addition of lithium carbonate, which acts as a catalyst as described above, and then removing the lithium carbonate, the polyethylene resin in the molten state may alternatively be agitated with the lithium carbonate which has been molded into a rod with a bonding agent as an alternate application of lithium carbonate as catalyst. In this case, the lithium carbonate and the polyethylene resin are generally contacted with each other less sufficiently, it may thus be necessary to conduct a long period of treatment.

In this case, the lithium carbonate used functions as a catalyst, and thus its function is accelerated by increasing the reaction surface of and the reaction time with the lithium carbonate bar regardless of the particle size or the added amount of the lithium carbonate when lithium carbonate is powder. In this embodiment wherein no residual lithium carbonate is contained in the so-treated polyethylene resins, the deterioration of the frequency property of the pulse generation which could presumably be due to the residual lithium carbonate when the lithium carbonate added is not removed is not observed.

Moreover, while examples of applying the lithium carbonate to the ordinary polyethylene resin has been described, it is needless to say that the lithium carbonate can also be applied to the heat resistant cross-linked polyethylene resins.

Use of the Polyethylene Resins

The polymer materials suitable for electrical insulation which is obtained by adding about 1% by weight of lithium carbonate fine powder (of, e.g. 300 mesh) as "a filler" to a molten polyethylene resin which is then molded into a certain form, or alternatively by transforming a part of the polyethylene main polymer chains into the gauche chains by lithium carbonate used as a catalyst to a molten polyethylene resin which is then molded into a certain form as described above has an excellent partial discharge resistant property which can suppress the generation of the partial discharge due to the disappearance of the voids between one spherulite and the other and the voids generated during the molding, and it is possible to suppress the decrease of the insulation life in power cables such that a conductor is covered and insulated with a polyethylene resin in accordance with the present invention.

In this connection, it is needless to say that the aforementioned polymer material in accordance with the present invention suitable for electric insulation or the like can be used not only for the power cable but also for insulating materials of electric devices or the others such as a variety of containers, packings, liners, packaging films or fibers.

Furthermore, as the polyethylene resins, there can be used as described above not only the high-pressure low density polyethylene resins but also medium- or low-pressure high density polyethylene resins.

Examples of Practice

The present invention is now explained with reference to the Examples and Comparative Examples of the preparation of samples.

Low density and medium or high density polyethylene resins are thermoplastic resins, which can be formed or molded into any shapes by heating and produce a large number of molded articles. There are mentioned for example a film by a heating roll stretcher, a cover for insulating an electric wire by an extruder, a casting for insulating a power cable by heating impregnation or the like.

The forms of these resins for molding are generally prepared in the form of pellets (particles) to ensure that molding by heating can be easily conducted.

Various samples for the illustration of the present invention have been obtained by first preparing the aforementioned resin in the form of pellets or blocks and then molding it into a certain shape as a sample for test.

As the samples for measuring the infrared absorbance characteristics (FIG. 7), the frequency properties of pulse generation by partial discharge (FIG. 10) and the oxidation and deterioration properties by the discharge with parallel plate electrodes (FIG. 11), respectively, low density polyethylene resin having a gravity of 0.91 g/cm$^3$ (ASAHI-DOW M6545) was used as a polyethylene resin for the test, and samples were prepared from the resin, when the resin with no additive was tested, by heating pellets of the resin by means of a pair of molding rolls heated at 190° C. into a film sample of 0.1 mm thickness; and, when the resin with an additive was tested, by placing pellets of the resin (in a hard glass beaker) in a desiccator, heating the pellets to 190° C. by an electric heater in an atmosphere of nitrogen to be molten, to which a variety of fine powders as additives such as lithium carbonate having a particle size smaller than 300 mesh (46 μm) were added, agitating the mixture for about 5 minutes until it appeared to be mixed well to naked eyes, and transferring the melt to a teflon beaker to form pellets which were upon being cooled gradually to room temperature subjected to the same rolling operation used for the resin with no additive.

As the samples for polarization photomicrographs (FIGS. 6*a*, 6*b*, 6*c*, 6*d*, 6*e*, 6*f* and 6*g*, FIGS. 12*a*, 12*b* and 12*c*, and FIGS. 13*a*, 13*b* and 13*c*) for the illustration of the present invention, small amounts (several milligrams) of the various resins in the form of pellets were taken on cover glasses for a microscope and heated at 190° C. for about 10 seconds to form photomicrographic samples, respectively.

Moreover, a sample in an amount of 10 mg for measuring the temperature of pyrolysis was also taken from the aforementioned resins in the form of pellets.

As the raw materials for the resins in the form of pellets, there were used a low density polyethylene resin pellet (ASAHI-DOW M6545) and a high density polyethylene resin (MITSUI POLYCHEMICAL HZ7000F).

Examples for the preparation of various resins in the form of pellet according to the present invention are described below.

EXAMPLE 1

The low density polyethylene resin having a density of 0.91 g/cm$^3$ in a hard glass beaker was placed in a desiccator, heated to 190° C. with an electric heater in an atmosphere of nitrogen to form a melt, to which a fine powder of lithium carbonate having a particle size smaller than 300 mesh (46 μm) was added in an amount of 1% by weight, and the mixture was stirred for about 5 minutes until it was mixed well to naked eyes, then transferred into a teflon beaker to form a pellet, which was cooled gradually to room temperature to prepare a sample. The sample has the minimal values in both of the frequency of pulse generation by the partial discharge shown in FIG. 10 and the oxidation and deterioration by discharge with parallel plate electrodes shown in FIG. 11, and particularly large spherulites as shown in FIG. 6*b* have disappeared. It is pliable and thus suitable for the insulating materials of powder cables.

EXAMPLE 2

The high density polyethylene resin having a density of 0.955 g/cm$^3$ was heated to 210° C. by the same heating method as in Example 1 to form a melt, to which lithium carbonate having a particle size smaller than 300 mesh (46 μm) was added in an amount of 1% by weight and treated in the same manner as in Example 1 to prepare a sample in the form of pellets. In this sample, the spherulites have completely disappeared as shown in FIG. 6*g*.

EXAMPLE 3

The low density polyethylene resin having a density of 0.91 g/cm$^3$ was heated to 190° C. by the same heating method as in Example 1 to form a melt, to which 10% by weight of lithium carbonate having a particle size larger than 65 mesh (210 μm) was added and 10% by weight of paraffin was further added for lowering the viscosity of the melt, the mixture was stirred for about 20 minutes to form pellets, which were gradually cooled to room temperature. The resin in the form of pellets was then heated into a melt at 210° C. for 25 minutes in an atmosphere of nitrogen, and the lithium carbonate added was removed by a 300 mesh (46 μm) and the melt was processed into pellets, which were gradually cooled to room temperature to form a sample. The sample is the one on which lithium carbonate has acted as a catalyst, and large spherulites have disappeared as shown in FIG. 12*a*.

EXAMPLE 4

The resin in the form of pellets prepared in Example 1 and having 1% by weight of lithium carbonate added was subjected to dissolution in pure xylene in a weight of 10 times of the sample resin at 100° C. for 10 minutes, the xylene insoluble component containing lithium carbonate was removed by a filter, and the filtrate was left standing for drying to form a sample. When the sample was heated into a melt at 190° C. for 1 minute, the production of the spherulites were not observed as shown in FIG. 13*b*. Also, in this case, lithium carbonate has acted as a catalyst.

EXAMPLE 5

The sample obtained in Example 4 was heated with 2% by weight of dicumyl peroxide as a cross-linking agent at 130° C. for 10 minutes to prepare a sample which was crosslinked chemically. In the sample, no spherulites are observed as shown in FIG. 13*c*.

Comparative Example 1

When no additive is added to the low density polyethylene resin having a density of 0.91 g/cm$^3$, spherulites having a diameter of 20–30 μm are observed as shown in FIG. 6*a*.

Comparative Example 2

When no additive is added to the high density polyethylene resin having a density of 0.955 g/$cm^3$, large and clear spherulites having a diameter of about 90 μm are observed as shown in FIG. 6f.

Comparative Example 3

The low density polyethylene resin having a density of 0.91 g/$cm^3$ is heated to 190° C. into a molten state by the same heating method as in Example 1, cobalt carbonate having a particle size smaller than 300 mesh (46 μm) was added in an amount of 1% by weight, and a sample in the form of pellets was then prepared in the same way as in Example 1. The sample has, as shown in FIG. 6c, an extremely large number of spherulites observed, although the spherulites are out of shape.

Comparative Example 4

The low density polyethylene resin having a density of 0.91 g/$cm^3$ is heated to 190° C. into a molten state by the same heating method as in Example 1, quartz having a particle size smaller than 300 mesh (46 μm) was added in an amount of 1% by weight, and a sample in the form of pellets was then prepared in the same way as in Example 1. The sample has, as shown in FIG. 6d, an extremely large number of spherulites observed, although the spherulites are out of shape.

Comparative Example 5

The low density polyethylene resin having a density of 0.91 g/$cm^3$ is heated to 190° C. into a molten state by the same heating method as in Example 1, calcium carbonate having a particle size smaller than 300 mesh (46 μm) was added in an amount of 1% by weight, and a sample in the form of pellets was then prepared in the same treatment as in Example 1. The sample has, as shown in FIG. 6e, an extremely large number of spherulites observed, although the spherulites are out of shape.

What is claimed is:

1. A solid polymer material having improved electrical resistance which comprises a polyethylene resin which has undergone contact with lithium carbonate while the resin is molten and is substantially free from the polymerization catalyst used in its preparation until the content of spherulites of the polyethylene resin is reduced; the thus contacted polyethylene resin having the absorbance of infrared absorption at 1078 $cm^{-1}$ and 1352 $cm^{-1}$ and being substantially free of voids due to spherulites; the thus contacted polyethylene resin retaining therein the lithium carbonate which has been added thereto and which is contained therein substantially as lithium carbonate in a subdivided form and in a quantity of about 0.1 to 3% by weight of the polyethylene resin and the thus contacted polyethylene resin substantially retaining mechanical properties inherent in the polyethylene used.

2. A solid polymer material as claimed in claim 1, wherein the quantity of the lithium carbonate retained in the polyethylene resin is about 0.8–1.4% by weight.

3. A solid polymer material as claimed in claim 1, obtained by admixing lithium carbonate in a subdivided form with a molten polyethylene resin and cooling the admixture to solidify.

4. A solid polymer material having improved electrical resistance which comprises a polyethylene resin which has undergone contact with lithium carbonate while the resin is molten and is substantially free from the polymerization catalyst used in its preparation until the content of spherulites of the polyethylene resin is reduced, the thus contacted polyethylene resin having the absorbance of infrared absorption at 1078 $cm^{-1}$ and 1352 $cm^{-1}$ and being substantially free of voids due to spherulites; the thus contacted polyethylene resin having the lithium carbonate subsequently removed therefrom, before or after the solidification and the thus contacted polyethylene resin substantially retaining mechanical properties inherent in the polyethylene resin used and the thus contacted polyethylene resin having a crystalline structure such that its gauche structure content determined by the absorbance of infrared absorption of 1078 $cm^{-1}$ is at a level increased from the level for the polyethylene before it is contacted with lithium carbonate and its degree of crystallinity being independent of the cooling velocity of the polyethylene cooled from its molten state.

5. A solid polymer material as claimed in claim 4, wherein the lithium carbonate contacted with the molten polyethylene is in a subdivided form and is removed from the admixture, before the solidification, by filtration, while the admixture is molten.

6. A solid polymer material as claimed in claim 4, wherein the lithium carbonate contacted with the molten polyethylene resin is in block form, which block is subsequently removed from the polyethylene resin before or after the solidification.

7. A solid polymer material as claimed in claim 4, wherein the lithium carbonate added to and contacted with the molten polyethylene is in a subdivided form and is removed from the admixture, before the solidification, by centrifugation, while the admixture is molten.

8. A solid polymer material as claimed in claim 1, wherein the contacted polyethylene resin is substantially free of spherulites of the polyethylene.

9. A solid polymer material as claimed in claim 4, wherein the contacted polyethylene resin is substantially free of spherulites of the polyethylene.

* * * * *

UNITED STATES PATENT AND TRADEMARK OFFICE

CERTIFICATE OF CORRECTION

PATENT NO. : 5,459,219

DATED : October 17, 1995

INVENTOR(S) : SHIGERU YAMAMOTO

It is certified that error appears in the above-indentified patent and that said Letters Patent is hereby corrected as shown below:

In drawings, change "Fig. 12(b) to read "Fig. 12(c)"; change "Fig. 12(c)" to read "Fig. 12(b)".

Signed and Sealed this

Sixteenth Day of April, 1996

Attest:

Bruce Lehman

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : 5,459,219

DATED : October 17, 1995

INVENTOR(S) : SHIGERU YAMAMOTO

It is certified that error appears in the above-indentified patent and that said Letters Patent is hereby corrected as shown below:

Column 2, line 35, change "configurations" to --conformations--;

Column 3, line 36, change "configurations" to --conformations--;

line 37, change "FIG. 1" to --FIG. 1a--;

line 38, change "configuration" to --conformation--;

line 41, change "configuration" to --conformation--;

line 42, delete "all" and insert --crystallized portions--;

line 45, change "configuration" to --conformation--;

line 49, change "configurations" to --conformations--;

line 59, change "Polyethylene" to --Crystallized portions of polyethylene--.

UNITED STATES PATENT AND TRADEMARK OFFICE
CERTIFICATE OF CORRECTION

PATENT NO. : 5,459,219
DATED : October 17, 1995
INVENTOR(S) : Shigeru Yamamoto

It is certified that error appears in the above-indentified patent and that said Letters Patent is hereby corrected as shown below:

Column 4, line 38, change "12" to —13—.

Column 6, line 38, delete "non-".

Column 7, line 45, change "configuration" to —conformation—.

Column 13, line 43, delete "resistance" and insert therefor —insulating properties—.

Column 14, line 12, delete "resistance" and insert therefor —insulating properties—.

Signed and Sealed this
First Day of October, 1996

Attest:

BRUCE LEHMAN

*Attesting Officer* — *Commissioner of Patents and Trademarks*